United States Patent [19]

Salikhov et al.

[11] 4,409,101

[45] Oct. 11, 1983

[54] FLUIDIZED BED APPARATUS

[75] Inventors: Zufar G. Salikhov; Vasily A. Ivanov; Viktor P. Vyatchinov, all of Moscow; Vladimir I. Maltsev, UST-Kamenogorski; Sergei S. Grozdev, Moscow; Nikolai V. Khodov, Ordzhonikidze, all of U.S.S.R.

[73] Assignee: Moskousky Institut Stali I Splavov, Moscow, U.S.S.R.

[21] Appl. No.: 321,917

[22] Filed: Nov. 16, 1981

[51] Int. Cl.³ .............................................. B01D 53/12
[52] U.S. Cl. ...................................... 210/266; 55/390; 210/284; 210/290; 422/142; 422/311
[58] Field of Search ........................ 55/34, 60, 77, 181, 55/390; 201/31; 210/786, 275, 283-286, 290; 422/139, 140, 142, 143, 311

[56] References Cited

U.S. PATENT DOCUMENTS

| 789,595 | 5/1905 | Duncan et al. | 210/283 |
| 2,606,104 | 8/1952 | Hogan et al. | 422/139 |
| 2,788,263 | 4/1957 | Engelke | 55/390 X |
| 2,893,849 | 7/1959 | Krebs | 422/143 |
| 3,288,567 | 11/1966 | Graham | 422/140 |
| 3,554,377 | 1/1971 | Miller | 210/283 X |
| 4,052,300 | 10/1977 | Mosso | 210/786 |

FOREIGN PATENT DOCUMENTS

| 521906 | 9/1976 | U.S.S.R. | 210/275 |
| 552096 | 4/1977 | U.S.S.R. | 210/284 |
| 645711 | 2/1979 | U.S.S.R. | 210/283 |

Primary Examiner—Robert H. Spitzer
Attorney, Agent, or Firm—Lilling & Greenspan

[57] ABSTRACT

The fluidized bed apparatus comprises, successively arranged in the upward direction along the vertical longitudinal axis thereof, a receptacle for coarser fractions, an upwardly flaring receptacle for medium fractions and an upwardly flaring receptacle for fine fractions. The fluidized bed apparatus further comprises grates extending perpendicularly to the longitudinal axis thereof in the receptacles for fine fractions and for medium fractions.

9 Claims, 1 Drawing Figure

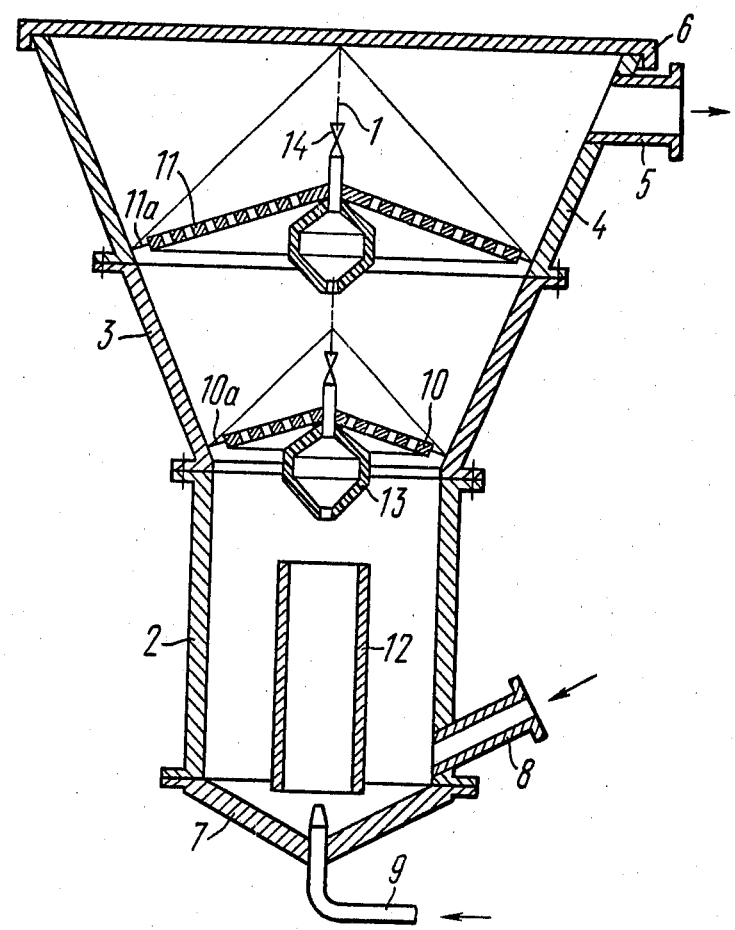

FLUIDIZED BED APPARATUS

FIELD OF THE INVENTION

The invention relates to apparatus for conducting metallurgical and like production processes, and more particularly it relates to a fluidized bed apparatus.

A specialist competent in the art knows that the expression "fluidized bed" refers to the phenomenon of supporting particles of a solid substance or of a solid agent in the ascending stream of a liquid and/or gaseous medium or agent. A bed of this kind is usually formed when a stream of a liquid and/or gaseous agent flows upwardly through a layer of a solid agent, with the particles of the latter being driven through chaotic movement and the layer expanding.

A fluidized bed may exist at velocities of the fluidizing stream of the liquid and/or gaseous agent exceeding a specific value called the initial fluidizing velocity. The ascending stream of the liquid and/or gaseous agent, maintaining the fluidized bed, is referred to as the fluidizing stream.

The invention can be utilized to utmost effectiveness in a plant for treating multifraction or polydispersed polymetallic ores in non-ferrous metallurgy, i.e. for conducting extraction and oxidation processes in a "solid-gas-liquid" fluidized system, i.e. in a three-phase fluidized system.

The term multifraction or polydispersed refers to a solid phase composed of particles of different size ranges or fractions.

The present invention can be further utilized in various apparatus for treating in a fluidized bed other known ores and minerals in the metallurgical and chemical industries.

DESCRIPTION OF THE PRIOR ART

There is known a fluidized bed apparatus for conducting hydrometallurgical processes, comprising, successively arranged in the upward direction along the vertical longitudinal axis thereof, a cylindrical vessel or receptacle for coarser fractions, an upwardly flaring vessel or receptacle for medium fractions and an upwardly flaring vessel or receptacle for fine fractions. The three receptacles are axially aligned and communicate with one another.

The receptacle for fine fractions has a lid mounted thereon, while the receptacle for coarser fractions has a bottom. The housing of the apparatus has inlet pipes for introducing into the receptacle for coarser fractions a compressed gas and the initial product to be treated in the fluidized bed, mounted in the side wall of this receptacle with an inclination relative to the vertical longitudinal axis of the fluidized bed apparatus.

There is also an outlet pipe for the treated product, for withdrawing the latter from the fluidized bed apparatus, mounted in the side wall of the receptacle for fine fractions, also with an inclination relative to the vertical longitudinal axis of the fluidized bed apparatus.

The abovementioned receptacles adjoin each other so that the top edge of the receptacle for coarser fractions is adjoined by the bottom edge of the receptacle for medium fractions, of which the top edge is adjoined by the bottom edge of the receptacle for fine fractions.

Mounted transversely of the vertical axis of the fluidized bed apparatus is a grate intended for even distribution of the fluidizing stream of the fluid agent across the volume of the fluidized bed apparatus, the grate being accommodated in the receptacle for coarser fractions (see, for example, Collection of Scientific Works of State Scientific-Research Institute of Non-Ferrous Metals, "Metallurgy of Non-Ferrous Metals", in Russian, No. 29. METALLURGIA Publishers, Moscow, 1969, p. 123).

This known apparatus of the fluidized bed type has proved to be inadequately reliable in operation of treating multifraction or polydispersed ores.

The known apparatus is insufficient in utilizing the oxygen of air fed as part of the initial product.

These deficiencies can be explained by the fact that with the grate accommodated in the receptacle for coarser fractions and with the generally large diameter of this receptacle, selected to provide reliable withdrawal of the treated product from the fluidized bed apparatus, the fluidizing of the coarser particles, as experience has shown, is conducted in this receptacle with an insufficient velocity. This drawback becomes particularly pronounced when the feed rate of the liquid agent supplied into the fluidized bed apparatus as part of the initial product to create the fluidizing stream is limited to comply with the adopted technology of conducting the process.

There have been attempts to provide for the required velocity of fluidizing the coarser particles by adding to the fluidizing stream an additional amount of compressed gas introduced specifically for this purpose. However, experience has shown that this affects the conditions of fluidizing the particles of the medium and fine fractions, thus impairing the process technology by sharply reducing the degree of interaction of the component agents of the initial product in the fluidized bed apparatus.

There have taken place other attempts to attain the required fluidizing velocity by increasing the tapering angle of the conical receptacles of the fluidized bed apparatus to about 60°. However, with this considerable tapering angle there takes place significant deposition of solid particles on the walls above the grate, which can be already observed with a tapering angle as big as 45°.

The particles settling on the housing wall accumulate, consolidate and eventually slide down the walls of the fluidized bed apparatus in dense layers onto the surface of the grate. This increases the flow resistance of the grate at the peripheral part thereof and causes an increased velocity of the fluidizing stream adjacent to the vertical longitudinal axis of the apparatus.

The uneven distribution of the velocities across the fluidized bed apparatus affects the uniformity of the fluidized bed produced therein, with the coarser particles being thrown out of the central zone of the fluidized bed into the lower velocity zone, i.e. toward the walls of the fluidized bed apparatus, which causes even more intense clogging of the openings of the grate with solid particles, particularly, at the periphery thereof.

To deal with this phenomenon, there have been used in some cases relatively complicated mechanical devices for continuously cleaning the openings of the grate; in other cases, the structure of the grate enables it to fall under the increased weight of the particles accumulated thereon, so as to restore its initial flow resistance by cleaning its openings from the settled particles.

However, in both cases the construction of the apparatus and its maintenance are complicated.

In the known fluidized bed apparatus, compressed gas (compressed air) is fed through a specific pipe in the wall of the receptacle for coarser particles under the grate, to clean the latter's opening from the deposited particles. The compressed gas is fed periodically to make the deposited particles leave the grate completely, i.e. to completely free the openings of the grate.

However, in this case the cleaning of the grate openings from deposited particles is more often than not accompanied by a distortion of the present velocities of the fluidizing stream flowing vertically through the fluidized bed apparatus, selected to provide for the most complete interaction of the component agents of the initial product in the fluidized bed.

This can be explained by the fact that, in order to make the fluidized stream pass through the grate whose openings are closed by the stationary layer of deposited particles, the gas has to be fed under considerable pressure. Therefore, the fluidizing of this stationary layer on the grate and the cleaning of the latter by feeding the compressed gas is always accompanied by increased velocities of the ascending stream vertically along the fluidized bed apparatus above the grate, to values 2 to 3 times greater than the preselected ones. In this case particles of the solid agent are no longer suspended as required by the technology of interaction of the component agents of the initial product, but become carried away from the fluidized bed, i.e. the required time of their residence of the fluidized bed, sufficient for complete interaction of the component agents of the initial product, is curtailed.

SUMMARY OF THE INVENTION

It is the main object of the present invention to create a fluidized bed apparatus wherein the grate should be accommodated so as to provide for maintaining the technologically preset velocities of the fluidizing stream over the entire height of the apparatus.

It is another object of the present invention to create a fluidized bed apparatus wherein the grate should occupy a position enhancing the reliability of the performance of the apparatus and the dependability of continuously conducting therein the production processes.

It is still another object of the present invention to create a fluidized bed apparatus, wherein the grate should be arranged to provide for enhanced efficiency of the utilization of the compressed gas fed in as a component of the initial product.

These and other objects are attained in a fluidized bed apparatus comprising, successively arranged in the upward direction along the vertical longitudinal axis thereof and communicating with one another, a receptacle for coarser fractions, with inlet pipes for the compressed gas and for the initial product to be treated in the fluidized bed; an upwardly flaring receptacle for medium fractions; and an upwardly flaring receptacle for fine fractions, provided with an outlet pipe for the treated product; and a grate extending transversely of the vertical longitudinal axis of the fluidized bed apparatus, and accommodated in the receptacle for fine fractions.

This arrangement of the grate enables reduction of the flaring angle of the receptacles for the medium and fine fractions, by precluding the possibility of distorting the technologicially adopted process conducted in the fluidized bed with continuous feed of the compressed gas, i.e. compressed air, which will be explained hereinbelow.

This arrangement enhances the reliability of the performance of the fluidized bed apparatus by minimizing the deposition of particles on the walls of the receptacles, and enhances the efficiency of utilizing the oxygen of the air.

Besides, in the disclosed fluidized bed apparatus there has been eliminated the necessity of overcoming the flow resistance of the grate by the fluidizing stream at high velocities of the motion of the compressed gas through the grate openings (the pressure loss across the grate being directly proportional to the velocities of the flow of the gas through the openings).

This enables utilizes the head of the compressed gas fed into the fluidized bed apparatus for conveying the multifraction initial product (and in some cases, the liquid agent) into the receptacle for coarser particles.

In the disclosed fluidized bed apparatus the continuous feed of the compressed gas would not distort the technological process conducted therein.

This can be explained by the fact that the zone of action of the gushing layer, i.e. of the part of the fluidizing stream whose direction coincides with the vertical longitudinal axis of the apparatus and whose velocities are significantly in excess of those of the rest of the fluidizing stream, is limited by the grate accommodated in the receptacle for fine fractions, since the high velocity of the fluidizing stream in the disclosed fluidized bed apparatus is lost while overcoming the flow resistance of the grate.

As has been already mentioned, the zone of uniform velocities of the fluidizing stream within the horizontal section of each fluidized bed is predominantly dependent on the grate diameter. The grate diameter, in turn, is determined depending on the actual velocities of the fluidizing stream, and in the presently disclosed fluidized bed apparatus it is 10 to 15 times greater than the grate diameter in the fluidized bed apparatus of the prior art. Therefore, the height of uniform velocities of the fluidizing stream in the horizontal sections of the fluidized bed in the apparatus of the disclosed structure is correspondingly greater.

This provides basis for stating that in the herein disclosed structure of a fluidized bed apparatus intense interaction of all the component agents of the initial product is provided, with the continuous feed of compressed gas into the receptacle for coarser particles. The creation of the uniform fluidized bed with the continuous feed of compressed gas enables an increase in the diameter of the receptacle for coarser particles at least 2 to 3 times, and, thus, with the same height as the fluidized bed apparatus of the prior art, a reduction of the flaring angle of the conical receptacles for medium and fine fractions to an angle providing for rapid sliding down of solid particles along the walls of these receptacles, i.e. precluding accumulation of particles on the walls.

On the other hand, the oxygen of the air passing through the grate and through the uniformly fluidized bed of fine particles, i.e. through the fluidized bed of uniform velocities and sufficiently great height, actively takes part in the production process.

It is expedient that the grate be arranged with a gap defined between its periphery and the internal surface of the receptacle for fine fractions.

This arrangement of the grate enables particles accidentally settling on the walls of the receptacle for fine particles to slide down freely along these walls into the underlying receptacles.

Otherwise, with this gas not afforded, these accidentally settling particles would be eventually accumulated on the periphery of the grate. This could affect the design-calculated value of the cross-section of the respective receptacle, and, hence, the technologically preselected velocity of the fluidizing stream; i.e. it could have affected the technology of the process conducted in the fluidized bed apparatus.

It is also very expedient that the fluidized bed apparatus should comprise another grate extending in the receptacle for medium fractions substantially parallel to the first-mentioned grate, with the openings in this second grate being horizontally staggered relative to the openings in the first-mentioned grate.

This structural feature enables transformation of the gushing layer in the receptacle for medium fractions into a uniformly fluidized bed.

With the openings in the second grate being horizontally staggered relative to the openings in the first-mentioned grate and with the predetermined sizes of these openings, it becomes possible to enhance the uniformity of the fluidized bed in the receptacles for fine and medium fractions. It is explained by the intensification of the process of breaking up at the two grates the ascending stream of gas bubbles.

It is further expedient that the second grate be arranged with a gap defined between the periphery thereof and the internal surface of the receptacles for medium fractions.

As it has been already explained hereinabove, this prevents accumulation of deposited particles on the peripheral surface of the grate.

It is still further expedient that the receptacle for coarser particles should accommodate therein a pipe extending substantially along the vertical longitudinal axis of the fluidized bed apparatus and spaced from the bottom of the receptacle for coarser particles, the pipe being intended for confining an upward flow of the initial product, the inlet pipe for the compressed gas being arranged coaxially with this pipe.

The provision of this pipe in the receptacle for coarser particles in combination with the above disclosed arrangement of the inlet pipe for the compressed gas and the arrangement of the grate in the receptacle for fine fractions ensure the uniform fluidized state of the coarsest fractions internally of said pipe, while maintaining the relatively great diameter of the receptacle for coarser fractions and the minimized flaring angle of other receptacles, selected to satisfy the condition of continuous sliding down of particles settling on the walls.

This construction of the fluidized bed apparatus further enables headless (or pressure-less) introduction of the initial product into the apparatus, owing to the ejection or aspiration effect taking place intermediate the pipe accommodated in the receptacle for coarser fractions and the inlet pipe for the compressed gas, arranged coaxially with this pipe.

It is advisable that the first-mentioned grate be shaped as a cone flaring in the direction toward the receptacle for coarser particles and be connected to the wall of the receptacle for fine fractions with elements having one end fixed to the grate and the other end freely bearing upon the wall of the receptacle for fine particles.

It is further advisable that the second grate be likewise shaped as a cone flaring in the direction toward the receptacle for coarser fractions and be connected with the wall of the receptacle for medium fractions with elements having one end fixed to the second grate and the other end freely bearing upon the wall of the receptacle for medium fractions.

With the grates shaped as cones flaring toward the underlying receptacle for coarser fractions, continuous motion of particles settling on the grates toward the peripheral gaps is provided. Through these gaps the particles find their way into the underlying receptacle for medium fractions and receptacle for coarser fractions, respectively, where the fluidizing stream has higher velocities. In this way, there is ensured continuous fluidization of the particles either sliding or moving down the wall of the receptacles.

Besides, this construction and arrangement of the grates provide a more uniform fluidized bed of all the particles and prevent overflowing of the grates by the ascending stream through the peripheral gaps. The conical shape of the grates also enhances their response to the variations of the head of the fluidizing stream.

Here and hereinbelow, the response of each grate to the variations of the head of the fluidizing stream is understood as the increment of the growth of the head required for commencing the motion of the grate either up or down along the vertical longitudinal axis of the apparatus.

As the grates in the herein disclosed fluidized bed apparatus are not rigidly connected with the receptacles, the increasing of the head of the fluidizing stream, satisfying the predetermined response, creates a buoyancy force under the grate, and the latter starts "floating up". However, in this case the gaps between the edges of the grates and the respective walls of the fluidized bed apparatus begin to grow due to the conical shape of the walls, thus lowering the pressure or head loss of the fluidized bed apparatus at the level of these floating grates.

This head loss reduction reduces the buoyancy force lifting off the grate, since the head of the fluidizing stream under each grate drops sharply due to the loss of the head of the fluidizing stream overcoming the weight of the grates. The grate moves in this manner until the cause bringing to life the response of the grates to head variations is eliminated.

In general, there are two causes of the efforts lifting off the grate: the increasing flow resistance of the grate (the increased pressure loss across the grate) on account of solid particles settling on its surface, and pulsations of the head of the fluidizing stream. The ability of the grates to move vertically in the fluidized bed apparatus ensures the active self-stabilization of their flow resistance, i.e. the grates are capable of self-cleaning from the particles settling on their surface and enhance the agitation of the initial product, owing to the latter's low-frequency vibration resulting from pulsation of the head of the fluidizing stream.

It is advisable that the fluidized bed apparatus comprise a vessel extending along the vertical longitudinal axis thereof, attached to the first-mentioned grate and communicating with a compressed-gas source through a pressure regulator.

It is also advisable that the fluidized bed apparatus include a vessel extending along the vertical longitudinal axis thereof and attached to the second grate and communicating with a compressed-gas source through a pressure regulator.

This construction of the fluidized bed apparatus increases the zone of response (or, in other words, reduces the zone of non-response) of the grates to the variations of the fluidizing stream head. The abovementioned zone of non-response may be caused by the difficulties encountered in matching the value of the lift-off force to the initial hydraulic flow resistance of the grates and the fluidizing stream velocity.

With the abovementioned vessel filled with compressed gas, the buoyancy of the respective grate is increased. By regulating the gas pressure in the vessels, the grate may be brought into a suspended state in the fluidizing stream under the concrete operating conditions of the fluidized bed apparatus. As the suspended state of any object corresponds to a balance between the buoyance force generally proportional to the head of the fluidizing stream and the pressure loss (or flow resistance) across the object, and the latter's weight, the slightest alteration of this balance would result in a displacement of the object, i.e. of the grate. This explains the enhanced response of the grate to the variations of the head of the fluidizing stream. When one considers that the head of the fluidizing stream is directly proportional to the flow resistance of each grate, it becomes obvious that such variations would result in a vertical displacement of the grate.

The sum total of the above specific novel features of the disclosed fluidized bed apparatus precludes the possibility of distortion of technologically predetermined velocities of the fluidizing stream in any section of the apparatus over the entire height thereof, which enhances the reliability of its performance.

The proposed construction of a fluidized bed apparatus, in addition to enhancing the reliability of its performance and the dependability of continuously conducting the production process therein, provides also for a higher efficiency of the utilization of the compressed gas as part of the initial product, as well as simplifying the feed of the initial product into the fluidized bed.

BRIEF DESCRIPTION OF THE DRAWING

The abovementioned specific features and other advantages of the apparatus in accordance with the invention will become more apparent from the following description of an embodiment thereof and the appended drawing, showing a longitudinal sectional view of a fluidized bed apparatus constructed in accordance with the invention.

DETAILED DESCRIPTION OF THE INVENTION

In the drawing, the fluidized bed apparatus embodying the present invention has a vertical longitudinal axis 1 and comprises, successively arranged in the upward direction, a receptacle or vessel 2 for coarser fractions, shaped as a cylinder, and an upwardly flaring conical receptacle 3 for medium fractions. The receptacle 3 for medium fractions is joined at the top by an upwardly flaring conical receptacle 4 for fine fractions. Mounted at the top of the receptacle 4 is an outlet pipe 5 for the treated product and a splash-preventing lid 6.

The area $S_1$ of the smallest cross-section of the receptacle 2 for coarser fractions is related to the area $S_2$ of the greatest cross-section of the receptacle 4 for fine fractions as the ratio of the initial fluidizing velocity $V_1$ of the coarser fractions to the initial fluidizing velocity $V_2$ of the finest fraction, i.e.

$$S_1:S_2 = V_1:V_2.$$

The walls of receptacles 2, 3 and 4 are preferably made of a corrosion-resistant material 5 to 8 mm thick, with the conical flaring angle of the receptacles 3 and 4 within 45°, to provide for unobstructed sliding of solid particles down the walls.

The receptacle 2 for coarser fractions has a bottom 7 of a conical shape. Mounted adjacent to this bottom 7 in the wall of the receptacle 2 is an inlet pipe 8 for the initial product, communicating with the source (not shown) of the initial product including liquid and solid agents.

Mounted in the bottom 7 in alignment with the vertical longitudinal axis 1 in a central opening (not shown) is an inlet pipe 9 for the compressed gas (e.g. compressed air) supplied under pressure from a source (not shown) to produce a fluidizing stream.

Accommodated in the receptacle 4 for fine fractions is a grate 10 extending transversely of the vertical longitudinal axis 1. The grate 10 is made of a sheet material and is so arranged that its periphery defines a gap with the adjacent internal surface of the receptacle 4 for fine fractions.

Experiments have shown that the value of this gap should be at least 20 to 50 mm, to provide for unobstructed motion of the layer of solid particles along the walls of the fluidized bed apparatus.

The receptacle 3 for medium particles accommodates another grate 11 extending parallel with the grate 10, with the respective openings (not indicated) of the grates 10 and 11 being relatively horizontally staggered, for the jet of the fluidized stream, issuing from any one of the openings of the grate 11 not to be directed at the corresponding adjacent opening of the grate 10. The size and amount of the openings in the grates 10 and 11 are selected to provide a uniformly fluidized bed of the particles of the fine and medium fractions, respectively, in the receptacles 4 and 3. As does the grate 10, the grate 11 defines a gap of about 20 to 50 mm between its entire periphery and the internal wall of the receptacle 3 for medium fractions. The grates 10 and 11 are not rigidly connected with the walls of the respective receptacles 4 and 3, which enables their limited forced reciprocation along the axis 1. The positioning of the grates 10 and 11 is effected with the use of known guiding elements (not shown) providing for their strict parallelism with their initial position, as they are moved along the axis 1.

The grates 10 and 11 are connected with the walls of the respective vessles 4 and 3 by resilient elements 10a and 11a, each having one attached to the respective grate 10 or 11 and its other end freely bearing upon the walls of the receptacles 4 and 3.

Accommodated in the receptacle 2 for coarser fractions is a pipe 12 extending along the axis and spaced from the bottom 7, intended for confining an ascending stream of the initial product, the inlet pipe 9 for the compressed gas being coaxial with this pipe 12. The cross-sectional area of the pipe 12 and its spacing from the bottom 7 are such that it is, in fact, an air-lift tube of the known structure, used in hydrometallurgy in pneumatic agitators. The height of the pipe 12 is limited by the height of the receptacle 2 for coarser particles; however, experiments have shown that for better uniformity of the distribution of the fluidizing stream the spacing of the top of the pipe 12 from the central point of the grate 11 should be at least 500 mm.

In the apparatus being described the grates 10 and 11 are shaped as cones flaring toward the receptacle 2 for coarser fractions. This shape of the grates 10 and 11 has been selected to enhance the uniformity of distribution of ascending gas bubbles entrained by the fluidizing stream, at the grates 10 and 11.

Underlying each of the grates 10 and 11 is a respective vessel 13 aligned with the axis 1 and having an opening (not indicated) in its bottom point, the vessel 13 communicating with a compressed-gas source (not shown) through a pressure regulator 14. Each vessel 13 is attached rigidly to its respective grate 10 or 11 (in the presently described emgodiment it is welded to the grate), so that an effort produced by filling the vessel 13 with the gas through the pressure regulator 14 should simultaneously move the respective grate 10 or 11 along the axis 1. The two vessels 13 do not practically influence the uniformity of the fluidized bed above the respective grates 10 and 11, but the pressure of the compressed gas preset-table with the regulator 14 is sufficient for driving the liquid agent from the vessel 13.

The actual dimensions, material and structure of the vessel 13, with the predetermined maximum permissible pressure of the compressed gas and the head of the fluidizing stream under the respective grate 10 or 11, are approximately calculated and designed to satisfy the condition of the balance of the buoyancy force produced and the weight of the grate 10 and 11, to provide for a precalculated suspended state of the respective grate 10 or 11 on the fluidizing stream. The final or actual suspended state of the grates 10 and 11 is attained by regulating the gas pressure in the respective vessels 13 by the pressure regulators 14.

To illustrate the operation of the fluidized bed apparatus embodying the invention, consider the example of conducting therein the process of oxidation of ferrous iron and zinc sulfide solutions.

The initial product containing the liquid agent in the form of zinc sulfide solutions and the solid agent in the form of manganese ore disintegrated to particle sizes of 1 to 10 mm are fed from a source by a pump (not shown) via the pipe 8, to introduce the initial product into the receptacle 2 for coarser particles. Compressed air enriched with oxygen is supplied from a source by a pump (not shown) via the compressed-gas inlet pipe 9. The jet of compressed air issuing at a high velocity from the compressed-gas inlet pipe 9 is directed along the vertical longitudinal axis 1 of the fluidized bed apparatus, axially of the pipe 12. This jet entrains the initial product and thus produces the fluidizing stream in the fluidized bed apparatus, the stream being a mixture of the zinc sulfide solutions with the manganese ore.

The cross-sectional area of the pipe 12 being a small fraction of the cross-sectional area of the receptacle 2 for coarser particles, the velocity of the fluidized stream inside the pipe 12 is correspondingly higher and sufficient for suspending therein the particles of the coarser fractions. In other words, it is sufficient for producing a uniformly fluidized bed of the coarsest particles within the pipe 12, while less coarse particles are carried out therefrom.

In the space between the top end of the pipe 12 and the bottom surface of the grate 11, the fluidizing bed has its velocity sharply reduced on account of the sharply increasing area of its propagation (which has been previously confined within the cross-section of the pipe 12) across the cross-section of the fluidized bed apparatus. As a result, some of the solid particles carried by the ascending stream from the pipe 12 gravitate toward the bottom 7, to be engaged once again by the jet of compressed air issuing from the compressed-gas inlet 9.

Medium and fine particles of the manganese ore are carried by the fluidizing stream through the openings of the grate 11 and the gap around its periphery into the receptacle 3 for medium fractions. In this receptacle 3 the velocity of the fluidizing stream is reduced to the initial fluidizing velocity of medium fractions. This provides for the creation of a uniformly fluidized bed of particles of medium fractions of the manganese ore. The reduction of the velocity of the fluidizing stream is caused by the increasing cross-sectional area upwardly of the receptacle 3 for medium fractions and by the loss of kinetic energy by the compressed air on account of its having conveyed the coarser particles of the manganese ore and having penetrated the fluidized bed of coarser particles and the grate 11. Owing to the considerable surface area of the conical grate 11, there is ensured the uniformity of the fluidized bed of the medium fraction particles practically over the entire height (90 to 100% of the height) of the receptacle 3 for medium particles. From the last-mentioned receptacle 3, the stream of air bubbles (since the jets of compressed air have already lost practically their entire kinetic energy and, consequently, their upward velocity), of the liquid agent and of the finest particles of the manganese ore, constituting the fluidizing stream for fine fractions, passes through the openings in the grate 10 and the gap around the periphery thereof into the receptacle 4 for fine fractions.

The increasing cross-section of the fluidized bed apparatus upwardly in the receptacle 4 for fine fractions provides for the reduction of the velocity of the fluidizing stream to the initial fluidizing velocity V of the finest particles which, as the adopted technology prescribes, should not be carried away from the fluidized bed apparatus.

Experiments have shown that the diameter of the grate 10 should be equal to or greater than the height of the receptacle 4 for fine fractions; in which case the provision of the grate 10 in the receptacle 4 ensures a uniformly fluidized bed of the finest particles over the entire height of the receptacle 4 for fine fractions. As the openings of the grate 11 are horizontally staggered relative to the openings in the grate 10, the air jets forming at random at the outlets of the grate 11 are broken up upon impinging on the partitions between the openings of the grate 10 and would not affect the uniformity of the fluidization of the finest particles within the receptacle 4.

Furthermore, this breaking up of the air jets promotes the interaction of the oxygen contained in the air bubbles with the rest of the agents, which is of great value to oxidation processes taking place owing to the interaction of ferrous iron and solutions of zinc sulfide with the particles of manganese ore in the fluidized beds in the receptacles 2, 3 and 4.

From the receptacle 4 for fine fractions, the treated product which contains the oxidized zinc sulfide solutions is withdrawn via the outlet pipe 5.

Specialists are well aware of the fact that the grates 10 and 11 are acted upon by a buoyancy of lifting-off force, having a value directly proportional to the flow resistance of the grates 10 and 11 (the pressure loss thereacross) and to the value of the head of the fluidizing stream. As this buoyancy force and the weight of the grate 10 and 11 become balanced, the respective grate attains, like the particles of the initial solid agent, a suspended state. This state is attained in the herein disclosed fluidized bed apparatus with the aid of the pressure regulator 14, by either driving the liquid agent from the respective vessel 13 through the opening therein, or else by letting additional liquid agent into this vessel 13.

In operation of the fluidized bed apparatus, some particles are driven toward the walls of the respective receptacles 2, 3 or 4 and settle on the surface of the grates 10 and 11. However, owing to the sufficient inclination of the walls and the surfaces, the settling particles move without delay or obstruction into the underlying receptacles with higher velocities of the fluidizing stream. This provides for their return into the corresponding fluidized bed and precludes the possibility of a layer of solid particles accumulating either at the walls of the receptacles 3 and 4, or on the surface of the grates 10 and 11, which, in its turn, prevents the eventuality of the fluidized bed apparatus becoming inoperative on account of a distortion of the predetermined velocities of the fluidizing stream at the corresponding cross-sections of the receptacles 3, 2 and 4.

Thus, over the entire height of each one of the receptacles 2, 3 and 4 there are produced, during operation of the apparatus, uniformly fluidized beds maintaining in the uniformly fluidized or suspended state the coarser, medium and fine particles of the solid agent, with compressed air being continuously supplied via the inlet pipe 9.

Let us explain in more detail the meaning of this conclusion:

(1) the disclosed arrangement and structure of the grates in the fluidized bed apparatus practically permit the continuous feed of the compressed gas via the pipe 9 and minimize the possibility of the openings of the grates 10 and 11 becoming clogged by particles of the solid agent settling on the grates;

(2) the possibility of this continuous feed of the compressed gas enables an increase in the area of cross-sectional diameter of the receptacle 2 for coarser fractions, which makes it possible, with the limited height of the fluidized bed apparatus, to have a smaller flaring angle of its walls to provide for unobstructed sliding down of deposited particles of the solid agent;

(3) the disclosed arrangement of the grates relative to the walls of the fluidized bed apparatus and the provision of the vessels attached to the respective grates 10 and 11 constitute prerequisites for self-initiated vibration of the grates, which minimizes still further the possibility of the grate openings becoming clogged;

(4) the minimized possibility of particles of the solid agent building up on the walls of the receptacles 2, 3 and 4 and in the openings of the grates 10 and 11 increases the duration of maintaining the uniformly fluidized state of particles of all the fractions practically throughout the entire volume of the fluidized bed apparatus;

(5) the increased duration of maintaining the uniformly fluidized state of particles of all the fractions throughout the volume of the apparatus signifies the enhanced reliability of the performance of the fluidized bed apparatus, with maximum intensity of interaction and efficiency of utilization of all the component agents in the production process conducted in the apparatus.

The prototypes of the herein disclosed apparatus have successfully passed a series of tests which have proven their high reliability, with the intensity of the interaction of the agents therein being 10 and 20 times greater than that attained with the use of pneumatic and mechanical agitators of the prior art, owing to the better agitation of the initial product.

A fluidized bed apparatus constructed in accordance with the present invention is simple to manufacture and assemble; and, it is dependable in operation and easy to maintain.

What is claimed is:

1. A fluidized bed apparatus with a vertical longitudinal axis, comprising: a receptacle for coarser fractions associated with an inlet pipe for compressed gas and an inlet pipe for an initial product to be treated in a fluidized bed; a receptacle for medium fractions having an upwardly flaring frustoconical shape; a receptacle for fine fractions having and upwardly flaring frustoconical shape, associated with an outlet pipe for the treated product; said receptacle for coarser fractions, said receptacle for medium fractions and said receptacle for fine fractions being arranged along the certical longitudinal axis of said fluidized bed apparatus in fluid communication with one another; a grate extending transversely to the vertical longitudinal axis of said fluidized bed apparatus in said receptacle for fine fractions and being attached by means of resilient elements to walls of said receptacle for fine fractions; a source of compressed gas communicating with a respective inlet pipe; a source of the initial product communicating with a respective inlet pipe.

2. A fluidized bed apparatus of claim 1, wherein said grate is positioned with a gap defined between the periphery thereof and an internal surface of said receptacle for fine fractions.

3. A fluidized bed apparatus of claim 2, wherein said grate is shaped as a cone flaring toward said receptacle for coarser fractions.

4. A fluidized bed apparatus of claim 3, further comprising a vessel extending substantially along the vertical longitudinal axis of said fluidized bed apparatus, attached to said grate and communicating with said compressed gas source through a pressure regulator.

5. A fluidized bed apparatus of claim 1, further comprising a second grate extending in said receptacle for medium particles substantially parallel with said first-mentioned grate, the openings in said second grate being horizontally staggered relative to the openings in said first-mentioned grate and said second grate being attached by means of resilient elements to walls of said receptacle for medium fractions.

6. A fluidized bed apparatus of claim 5, wherein said second grate is positioned with gap defined between the periphery thereof and an internal surface of said receptacle for medium fractions.

7. A fluidized bed apparatus of claim 6, wherein said second grate is shaped as a cone flaring toward said receptacle for coarser fractions.

8. A fluidized bed apparatus of claim 7, further comprising a vessel extending substantially along the vertical longitudinal axis of said fluidized bed apparatus, attached to said second grate and communicating with said compressed gas source through a pressure regulator.

9. A fluidized bed apparatus of claim 1, wherein said receptacle for coarser fractions accommodates therein a pipe extending substantially along the vertical longitudinal axis of said fluidized bed apparatus, spaced from the bottom of said receptacle for coarser fractions, said pipe confining an ascending stream of the initial product, said inlet pipe for compressed gas being arranged coaxially with said pipe.

* * * * *